(12) United States Patent
da Silva et al.

(10) Patent No.: US 8,629,645 B2
(45) Date of Patent: Jan. 14, 2014

(54) SYSTEM AND METHOD FOR ENERGIZING AN ELECTRIC MOTOR AUXILIARY WINDING AND ELECTRIC MOTOR

(75) Inventors: Douglas Pereira da Silva, Joinville (BR); Carlos Alberto Teixeira, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 861 days.

(21) Appl. No.: 12/673,314

(22) PCT Filed: Aug. 15, 2008

(86) PCT No.: PCT/BR2008/000242
§ 371 (c)(1),
(2), (4) Date: Jun. 29, 2010

(87) PCT Pub. No.: WO2009/021302
PCT Pub. Date: Feb. 19, 2009

(65) Prior Publication Data
US 2011/0006722 A1    Jan. 13, 2011

(30) Foreign Application Priority Data

Aug. 15, 2007  (BR) ...................................... 0703332

(51) Int. Cl.
*H02P 1/16*    (2006.01)
(52) U.S. Cl.
USPC ............ 318/778; 318/774; 318/779; 318/789
(58) Field of Classification Search
USPC .......... 318/774, 778, 779, 781, 785, 786, 789
See application file for complete search history.

(56) References Cited

U.S. PATENT DOCUMENTS

| | | | | |
|---|---|---|---|---|
| 4,843,295 A | * | 6/1989 | Thompson et al. | 318/786 |
| 5,051,681 A | * | 9/1991 | Schwarz | 318/786 |
| 5,103,154 A | * | 4/1992 | Dropps et al. | 318/782 |
| 5,528,120 A | * | 6/1996 | Brodetsky | 318/785 |

(Continued)

FOREIGN PATENT DOCUMENTS

| | | |
|---|---|---|
| EP | 1 100 190 | 5/2001 |
| WO | WO 95/19659 | 7/1995 |

OTHER PUBLICATIONS

International Preliminary Report on Patentability issued Feb. 16, 2010 for International Application No. PCT/BR2008/000242.

(Continued)

*Primary Examiner* — Bentsu Ro
*Assistant Examiner* — Thai Dinh
(74) *Attorney, Agent, or Firm* — Fay Sharpe LLP

(57) ABSTRACT

A system and a method for energizing an auxiliary winding of a capacitor-start single-phase induction motor for reducing the voltage level in the bidirectional switches during the blocking of said switches and for providing smooth switching of the electromechanical bidirectional switch. This is achieved by a system for energizing an auxiliary winding of an electric motor, the auxiliary winding being connectable in series with a voltage network, the system including a start capacitor and an electromechanical switch connected in series with the auxiliary winding, the system including an electronic switch connected in parallel with the series association of the electromechanical switch and the start capacitor, the electronic switch and the electromechanical switch being used to turn on the auxiliary winding, the system configured so that the electronic switch can be turned on simultaneously with the electromechanical switch and kept on simultaneously with the electromechanical switch for a stabilization time.

20 Claims, 2 Drawing Sheets

(56) References Cited

U.S. PATENT DOCUMENTS 6,407,530 B1 * 6/2002 Kwon et al. ............... 318/778
6,747,428 B1    6/2004 Kwon et al.
6,864,659 B2 * 3/2005 Ratz et al. ................. 318/772

OTHER PUBLICATIONS

International Search Report mailed Jul. 22, 2009 for International application No. PCT/BR2008/000242.

* cited by examiner

_US 8,629,645 B2_

SYSTEM AND METHOD FOR ENERGIZING AN ELECTRIC MOTOR AUXILIARY WINDING AND ELECTRIC MOTOR

This application claims priority of Brazilian patent case No. PI0703332-0 filed on Aug. 15, 2007, the disclosure thereof being herby incorporated by reference.

The present invention relates to a system and a method for energizing an auxiliary winding of a capacitor-start single-phase induction motor, which is commonly applied in, but not limited to, refrigeration compressors. The invention also relates to a motor itself, incorporating the system of the present invention.

DESCRIPTION OF THE PRIOR ART

The techniques for energizing the auxiliary winding of capacitor-start single-phase induction motors currently implemented use potential relays and current relays. The choice of which device will be used in a specific application depends on technical and economic factors. Currently, CSR (capacitive start and run) single-phase induction motors use potential relays, and CSIR (capacitive start inductive run) single-phase induction motors use current relays.

Potential and current relays have the disadvantage of having their electrical parameters strongly dependent upon the design of the motor to which the element will be applied, generating high SKUs (stock keeping units), increasing the complexity and the costs related to material handling.

BRIEF DESCRIPTION AND OBJECTS OF THE INVENTION

The objective of the present invention is to provide a system and a method for energizing an auxiliary winding of a capacitor-start single-phase induction motor, said system and method aiming at reducing the voltage level in the bidirectional switches present in the topology during the blocking of said switches. The system and method proposed also aim at providing smooth switching of the electromechanical bidirectional switch existing in the topology.

These gains in the reduction of the voltage level in the bidirectional switches and the smooth switching of the electromechanical bidirectional switch are achieved by a convenient arrangement of said bidirectional switches in the topology of the system proposed and by a convenient means of energizing said bidirectional switches.

According to the teachings of the present invention, the system and method disclosed provide that, together with the electromechanical switch commonly used for driving electric motors, there shall be an electronic switch connection, the electronic switch having overlapping operation periods with the electromechanical switch, thus providing the desired smooth switching, which was previously impossible to reach in electric motor starting systems.

Said objects are achieved by a system for energizing an auxiliary winding of an electric motor, the auxiliary winding being connectable in series with a network voltage, the system comprising a start capacitor and an electromechanical switch connected in series with the auxiliary winding, the system comprising an electronic switch connected in parallel with the series association of the electromechanical switch and the start capacitor, the electronic switch and the electromechanical switch being used to energize the auxiliary winding, the system being configured so that the electronic switch can be turned on simultaneously with the electromechanical switch and kept on simultaneously with the electromechanical switch for a stabilization time.

Said objects are further achieved by a system for energizing an auxiliary winding of an electric motor, the auxiliary winding being connectable in series with a network voltage, the system comprising a start capacitor and an electromechanical switch connected in series with the auxiliary winding, the system comprising an electronic switch connected in parallel with the series association of the electromechanical switch and the start capacitor, the electronic switch and the electromechanical switch being used to energize the auxiliary winding, a control unit which is electrically associated with the electromechanical switch and the electronic switch, the control unit being programmed so that the electronic switch can be turned on simultaneously with the electromechanical switch, the electronic switch and the electromechanical switch having overlapping operation periods in function of the connection and disconnection of the auxiliary winding.

A method of controlling the energizing of the auxiliary winding of an electric motor is also provided, the auxiliary winding being connectable in series with a network voltage, the method and system comprising a start capacitor and an electromechanical switch connected in series with the auxiliary winding, the method comprising the steps of: when connecting the auxiliary winding of the electric motor, turning on an electronic switch in parallel with the electromechanical switch; and keeping the electromechanical switch and the electronic switch simultaneously on for a connection stabilization time.

Also provided is an electric motor comprising a system for energizing an auxiliary winding of an electric motor, the auxiliary winding being connectable in series with a network voltage, the system comprising a start capacitor and an electromechanical switch connected in series with the auxiliary winding, the system comprising an electronic switch connected in parallel with the series association of the electromechanical switch and the start capacitor, the electronic switch and the electromechanical switch being used to energize the auxiliary winding, the system being configured so that the electronic switch can be turned on simultaneously with the electromechanical switch and kept on simultaneously with the electromechanical switch for a stabilization time.

BRIEF DESCRIPTION OF THE DRAWINGS

The present invention will be further described in more details based on one example of execution represented in the drawings. The figures show.

DETAILED DESCRIPTION OF THE DRAWINGS

Figure 1:
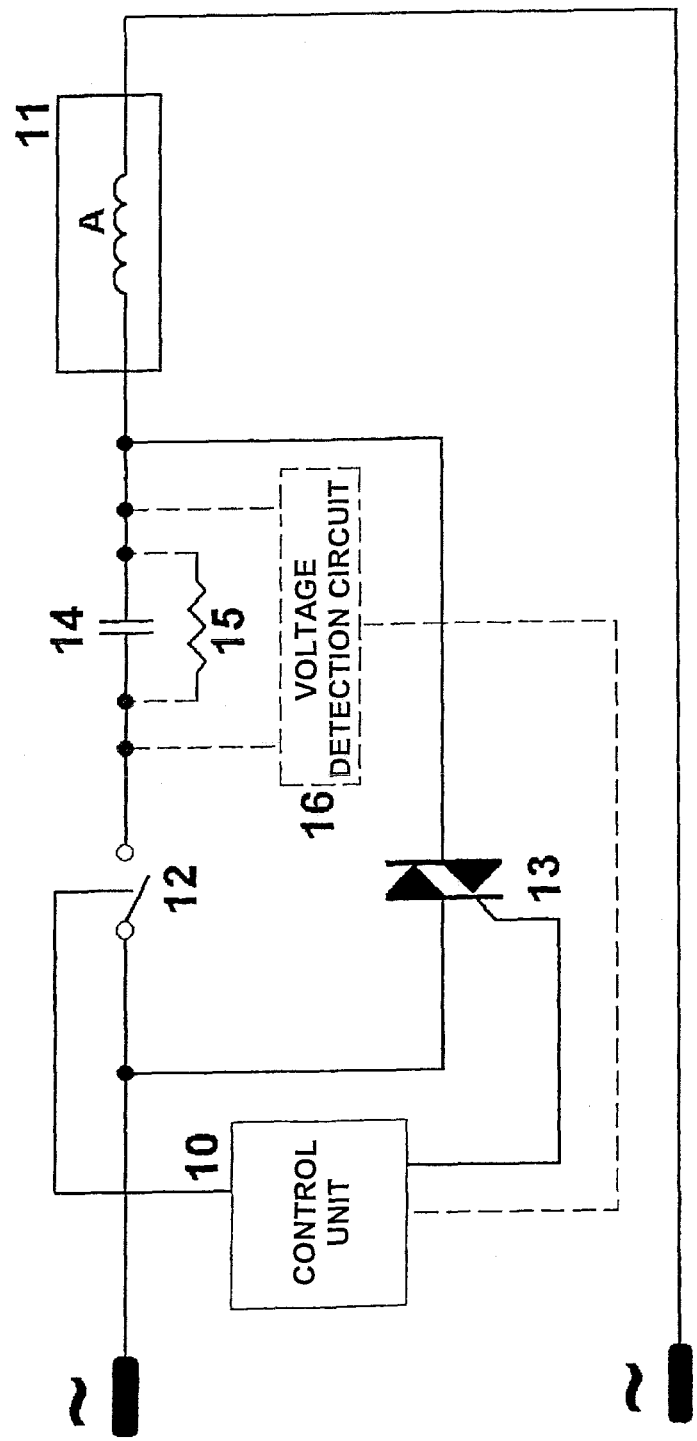
FIG. 1—a schematic diagram of the system according to the present invention.

As shown in FIG. 1, the system for energizing the auxiliary winding of an electric motor 11 (not shown) according to the present invention comprises an electromechanical switch 12 (or electromechanical bidirectional switch, preferably a relay), associated in series with a start capacitor 14, the terminals of this series association being associated in parallel with the electronic switch 13 (or semiconductor bidirectional switch, preferably a TRIAC), one side of the resulting association being connected to the power supply/network voltage, and the other side of the resulting association being connected to the auxiliary winding 11 of the single-phase induction motor. In addition, a discharge resistor 15 is provided being connected in parallel with the start capacitor 14 and with the purpose of reducing the voltage in the start capacitor 14 after disconnecting this component from the circuit that energizes the auxiliary winding 11.

Furthermore, a control unit 10 is provided which is electrically associated with the electronic switch 13 and the electromechanical switch 12, said control unit 10 being used to control the opening and closing of the electromechanical switch 12 and electronic switch 13, and thus smoothly controlling the energizing of the auxiliary winding 11, from the electromechanical switch 12.

For this to happen, the system controlled by the control unit 10 should be configured so that the electronic switch 13 can be turned on simultaneously with the electromechanical switch 12 and kept on simultaneously with the electromechanical switch 12 for a stabilization time $t_b$, $t_d$. This configuration can be seen in FIGS. 2 and 3, where it is noted that in order to ensure a smooth switching of the electromechanical switch 12, the control unit 10 is programmed so that the electronic switch 13 and the electromechanical switch 12 have overlapping operation periods in function of the connection and disconnection of the auxiliary winding 11.

In general, and as will be further described below, the switching of the electromechanical switch 12 should be preceded by, or concomitant with, the switching of the electronic switch 13, thus causing the overlapping periods mentioned above.

Figure 2:
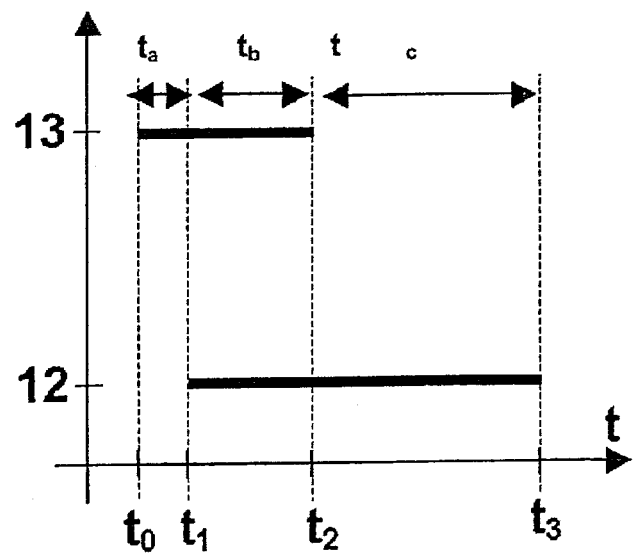
FIG. 2—a graph illustrating a first embodiment of the control method according to the present invention.

According to a first embodiment of the present invention, illustrated in FIG. 2, which shows that the control unit 10 must be configured to keep the electronic switch 13 on before the electromechanical switch 12 is turned on, for a connection time $t_a$, and alternatively the electromechanical switch 12 and the electronic switch 13 can be turned on at the same time, in which case the two switches will be kept on for a connection stabilization time $t_b$. Still according to the first embodiment of the present invention, the electromechanical switch 12 will be turned off directly, without turning the electronic switch 13 on again.

According to a second embodiment of the present invention, the system will be configured to have periods of overlapping operation of the electromechanical switch 12 and of the electronic switch 13 every time the electromechanical switch 13 is turned on or off.

Thus, according to this embodiment, when the electromechanical switch 12 is turned on, the control unit 10 should provide for the activation of the electromechanical switch 12 after or simultaneously with the switching of the electronic switch 13, as in the first embodiment of the present invention. In the procedure to turn off the electromechanical switch, the control unit 10 should be configured to have the electronic switch 13 turned on and kept on simultaneously with the electromechanical switch 12 for a disconnection stabilization time $t_d$, before the electromechanical switch 12 is turned off, and the electronic switch 13 should be kept on for a disconnection time $t_e$.

In both embodiments of the present invention, the system may be provided with a voltage detection circuit 16 connected in parallel with the start capacitor 14, said voltage detection circuit 16 being connected to the control unit 10 to inform the moments when the electric voltage on the terminals of the start capacitor is zero. This voltage detection circuit 16 is required due to the construction characteristics of the switches used, and more specifically in view of the characteristics of the TRIAC. In configurations in which the electromechanical switch 12 is used or in which it is eliminated and a TRIAC is connected in its place, or if the electromechanical switch 12 is interconnected with the electronic switch 13 in parallel, in order to turn off the auxiliary winding 11 it should be considered that the TRIAC can only be turned off when the current is zero, since this element is blocked only at zero current. At this moment the voltage in the start capacitor 14 will be maximum and therefore the peak voltage will be very high for TRIAC blocking commercial values, which makes it impossible to use it in these conditions. Similarly, using a disconnect relay only as an electromechanical switch 12, depending on the moment when it is used to disconnect, if the current is zero at the time of disconnection, the voltage in the start capacitor 14 will also be high. On the other hand, if the disconnection occurs at another instant, in which the voltage in the start capacitor 14 is low, the leakage inductance of the start winding 11 will cause an overvoltage on the elements of the circuit.

Thus, the use of the zero cross detector 16 has the purpose of reducing the voltage stress level on the electronic switch 13 and on the electromechanical switch 12.

Furthermore, in order to control the system for energizing an electric motor auxiliary winding of the present invention, a control method is provided, implemented through the control unit 10.

Figure 3:
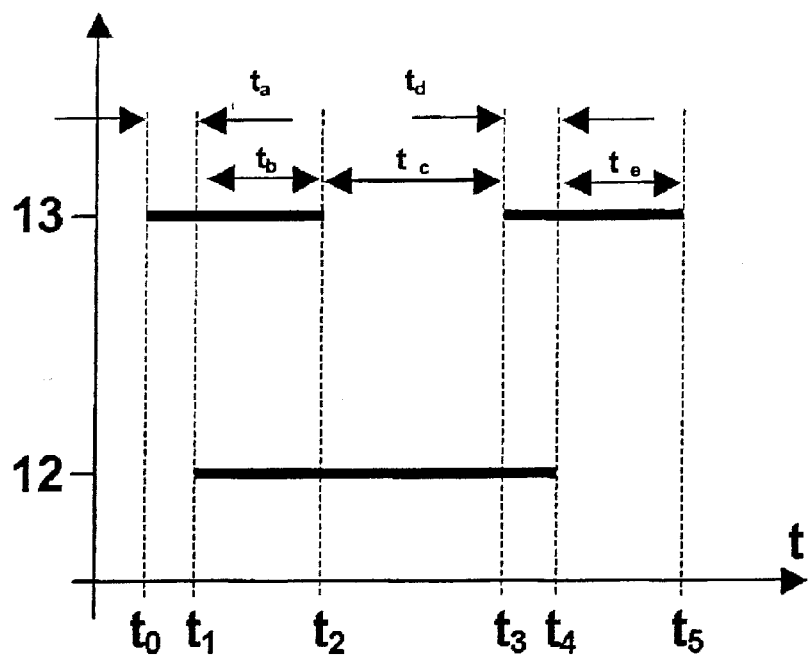
FIG. 3—a graph illustrating a second embodiment of the control method according to the present invention.

Thus, the control unit 10 will be programmed to follow the steps described below, which are shown in FIGS. 2 and 3.

According to the first embodiment, the activation of the electromechanical 12 switch will be concomitant with, or preceded by, the activation of the electronic switch 13, so that the sequence of steps is as follows: when the auxiliary winding 11 of the electric motor is connected, the electronic switch 13 is in parallel with the series association of the electromechanical switch 12 and of the start capacitor 14, and the two switches are simultaneously on for a connection stabilization time $t_b$, which connection time $t_b$ may or may not be preceded by a connection time $t_a$ (see chart in FIG. 2—connection time $t_a$ is between $t_0$ and $t_1$ and connection stabilization time $t_b$ is between $t_1$ and $t_2$). In this alternative, the electric motor will be operated through the electromechanical switch 12, which will be kept on for the time required to start the motor or for an operation time $t_c$, and will be turned off simply by turning off the electromechanical switch 12 (see $t_3$ in the chart in FIG. 2).

According to another alternative, as can be seen in FIG. 3, both when the electromechanical switch 12 is turned on and when it is turned off, the electronic switch 13 is turned on. In this case, the switching logic will be the same as in the other variation, and the switches will be turned off as follows:

before the electromechanical switch 12 is turned off, there will be a disconnection stabilization time $t_d$ during which the electromechanical switch 12 will be kept on simultaneously with the electronic switch 13 (see chart in FIG. 3—time between $t_3$ and $t_4$), and after the electromechanical switch 12 is turned off, the electronic switch 13 will be kept on for a disconnection time $t_e$ (see chart in FIG. 3—time between $t_4$ and $t_5$). Both the connection stabilization time $t_b$ and the disconnection stabilization time $t_d$ should be set so that the connectors of the electromechanical switch 12 have time to satisfactorily close or open, thus eliminating any transient.

In the two versions, when the electronic switch 13 and the electromechanical switch 12 are turned on simultaneously, the chart of FIGS. 2 and 3 will be changed (not shown) so that time $t_0=t_1$.

A further step according to the present invention is the step of constantly monitoring the voltage level of the start capacitor 14, so that the electromechanical switch 12 is turned off (see time $t_3$) at a moment in which the voltage on the start capacitor 14 is approximately zero.

The teachings of the present invention further provide for the manufacture of an electric motor or of a motor-compressor assembly provided with the system of the present invention in order to operate with a control logic, thus avoiding the excessive use of SKUs, as well as to eliminate the problem of switching the electromechanical switches according to the prior art.

The examples described above represent preferred embodiments, however, it should be understood that the scope of the present invention encompasses other possible variations, and is limited only by the content of the appended claims, which includes all possible equivalents.

The invention claimed is:

1. A system for energizing an auxiliary winding of an electric motor, the auxiliary winding (11) being connectable in series with a network voltage ($V_{AC}$), the system comprising,
a start capacitor (14) and an electromechanical switch (12) connected in series with the auxiliary winding (11),
the system being characterized by comprising an electronic switch (13) connected in parallel with the electromechanical switch (12), the electronic switch (13) and the electromechanical switch (12) being used to energize the auxiliary winding (11),
wherein the electronic switch (13) can be turned on simultaneously with the electromechanical switch (12) and kept on simultaneously with the electromechanical switch (12) for a stabilization time ($t_b$, $t_d$).

2. A system according to claim 1, wherein the electronic switch (13) is connected in parallel with the series association of the electromechanical switch (12) and the start capacitor (14).

3. A system according to claim 2, further comprising a control unit (10) that is electrically associated with the electromechanical switch (12) and with the electronic switch (13).

4. A system according to claim 3, wherein the control unit (10) is configured so that the electronic switch (13) is kept on before the activation of the electromechanical switch (12) during a connection time ($t_a$).

5. A system according to claim 4, wherein the control unit is configured so that the electronic switch (13) is turned on and kept on with the electromechanical switch (12) for a disconnection stabilization time ($t_d$), before the electromechanical switch (12) is turned off.

6. A system according to claim 5, wherein the control unit (10) is configured so that the electronic switch (13) is kept on for a disconnection time ($t_e$) after the electromechanical switch (12) has been turned off.

7. A system according to claim 1, wherein the electronic switch (13) is simultaneously turned on with the electromechanical switch (12).

8. A system according to claim 7, wherein electromechanical switch (12) comprises a relay and the electronic switch (13) comprises a TRIAC.

9. A system according to claim 8, further comprising a voltage detector circuit (16) connected in parallel with the start capacitor (14), the voltage detection circuit (16) being connected to the control unit (10) to inform the moments when the electric voltage on the terminals of the start capacitor is zero.

10. A system according to claim 9, further comprising a discharge resistor (15), the discharge resistor (15) being connected in parallel with the start capacitor (14).

11. A system for energizing an auxiliary winding of an electric motor, the auxiliary winding (11) being connectable in series with a network voltage ($V_{AC}$), the system comprising,
a start capacitor (14) and an electromechanical switch (12) connected in series with the auxiliary winding (11),
said system being characterized by comprising:
an electronic switch (13) connected in parallel with the electromechanical switch (12), the electronic switch (13) and the electromechanical switch (12) being used to energize the auxiliary winding (11),
a control unit (10) which is electrically associated with the electromechanical switch (12) and with the electronic switch (13),
the control unit (10) being programmed so that the electronic switch (13) can be simultaneously turned on with the electromechanical switch (12), the electronic switch (13) and the electromechanical switch (12) having overlapping operation periods in function of the connection and disconnection of the auxiliary winding (11),
wherein the electronic switch (13) is connected in Parallel with the series association of the electromechanical switch (12) and the start capacitor (14).

12. A system according to claim 11, wherein during the overlapping periods the electronic and electromechanical switches (12, 13) are kept on simultaneously for a stabilization time ($t_b$, $t_d$).

13. A system according to claim 12, wherein the electromechanical switch (12) comprises a relay and the electronic switch (13) comprises a TRIAC.

14. A method for energizing an auxiliary winding of an electric motor, the auxiliary winding (11) being connectable in series with a network voltage ($V_{AC}$), the system comprising
a start capacitor (14) and an electromechanical switch (12) connected in series with the auxiliary winding (11),
said method comprising the steps of:
when the auxiliary winding (11) of the electric motor is connected, connecting the electronic switch (13) in parallel with the series association of the electromechanical switch (12) and of the start capacitor (14); and
keeping the electromechanical switch (12) and the electronic switch (13) on simultaneously for a connection stabilization time ($t_b$).

15. A method, according to claim 14, further comprising the steps of:
when the auxiliary winding (11) is disconnected, turning on the electronic switch (13) in parallel with the electromechanical switch (12); and
keeping the electromechanical switch (12) and the electronic switch (13) on simultaneously for a disconnection stabilization time ($t_d$).

16. A method according to claim 15, wherein before the step of keeping the electromechanical switch (12) and the electronic switch (13) on simultaneously for a connection stabilization time ($t_b$), a step is provided of turning on the electronic switch (13) before the electromechanical switch (12).

17. A method according to claim 16, wherein the step of turning on the electronic switch (13) before the electromechanical switch (12), the electronic switch (13) is kept on before the switching of the electromechanical switch (12) for a connection time ($t_a$).

18. A method, according to claim 17, wherein after the electromechanical switch (12) is turned off, the electronic switch (13) is kept on for a disconnection time ($t_e$).

19. A method according to claim 18, further comprising a step of constantly monitoring the voltage level on the terminals of the start capacitor (14) so that the electromechanical switch (12) is turned off when the voltage on the start capacitor (14) is approximately zero.

20. An electric motor comprising a system for energizing an auxiliary winding of an electric motor, the auxiliary winding (11) being connectable in series having with a network voltage ($V_{AC}$) the system comprising.
- a start capacitor (14) and an electromechanical switch (12) connected in series with the auxiliary winding (11).
- an electronic switch (13) connected in parallel with the electromechanical switch (12), the electronic switch (13) and the electromechanical switch (12) being used to energize the auxiliary winding (11),
- the system being configured so that the electronic switch (13) can he turned on simultaneously with the electromechanical switch (12) and kept on simultaneously with the electromechanical switch (12) for a stabilization time ($t_b$, $t_d$),
- the system being characterized in that wherein the electronica switch (13) is connected in parallel with the series association of the electromechanical switch (12) and the start capacitor (14).

* * * * *